April 5, 1932.　　　J. H. SULLIVAN　　　1,852,864
SILICA WINDOW PANE
Filed Feb. 14, 1929
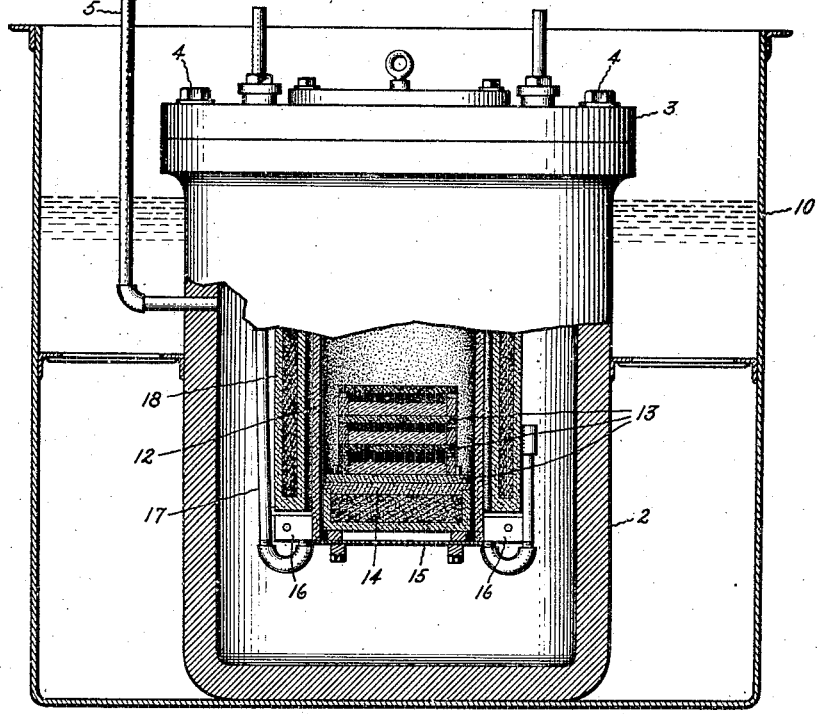
Fig. 1.
Fig. 2.
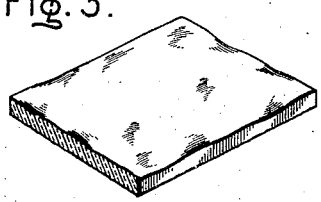
Fig. 3.
Inventor:
James H. Sullivan,
by Charles E. Tullar
His Attorney.

Patented Apr. 5, 1932

1,852,864

UNITED STATES PATENT OFFICE

JAMES H. SULLIVAN, OF SWAMPSCOTT, MASSACHUSETTS, ASSIGNOR TO GENERAL ELECTRIC COMPANY, A CORPORATION OF NEW YORK

SILICA WINDOW PANE

Application filed February 14, 1929. Serial No. 339,945.

The present invention relates to the fabrication of sheet material from fused silica which will be suitable for window pane purposes.

Due to its high transmissibility for the ultra-violet components of sunlight, silica constitutes a highly desirable window material for places in which the effect of such rays is desired.

The difficulty of producing sheets or panes of clear silica and the consequent high price of such windows has seriously limited their use.

As now well known, silica not only is highly refractory but even when submitted to a so-called fusion temperature assumes a plastic rather than a liquid state. For that reason it cannot be fabricated economically by the methods developed in the glass art.

Silica sheet material heretofore has been made by the laborious and expensive method of sawing ingots of vitreous silica into sheet form and then polishing the surface of the resulting sheets. As these ingots have been made by the fusion of quartz crystals, the fabricated material is commercially known as "fused quartz" and therefore this term is used in this specification as a synonymous name for vitreous silica.

In accordance with my invention, sheets having a thickness suitable for window use are fabricated by causing plastic (fused) silica in an unconfined state to assume a desired sheet form in a vacuum by gravity, applying pressure to the plastic material to reduce cavities and cooling to set the material to the solid state, these steps preferably being carried out as a continuous operation. As a consequence of my invention transparent silica sheet material having a thickness of about $\frac{3}{16}$ to $\frac{3}{8}$ inch is produced having a glazed surface requiring little or no smoothing preliminary to use. Such sheets are comparatively inexpensive and hence my invention renders practicable a widespread use of fused quartz or silica windows, both for dwellings, hospitals, sanitariums and similar places where the beneficial physiological effect of ultra-violet is desired, and for industrial plants where the chemical effect of ultra-violet is utilized, as for example, in the manufacture of patent leather.

My invention will be explained in greater detail in connection with the accompanying drawings which illustrates apparatus suitable for carrying out my invention. Fig. 1 illustrates in vertical section a silica fusion furnace; Fig. 2 illustrates on a somewhat larger scale and in perspective a plurality of fusion forms in stacked relation; and Fig. 3 shows a portion of a finished silica plate.

The fusion of silica to produce plate material in accordance with my invention may be carried out in a furnace which is similar to the furnace described in Letters Patent 1,536,821 issued to P. K. Devers on May 5, 1925. As shown in Fig. 1, such a furnace comprises a heavy metal-walled container 2 provided with a cover 3, which is secured to the main body of the container by bolts 4, and which is provided with a pipe 5, through which the interior of the container may be evacuated by means of a branch pipe 6 which may be shut off from the main pipe 5 by a valve 7. A gas under suitable pressure may be admitted to the interior of the furnace when the valve 7 is closed through another branch pipe 8 which is also provided with a valve 9. The exterior of the furnace may be cooled in any suitable way, as for example represented by the water jacket 10.

Within the furnace is provided a refractory heater 12, preferably consisting of graphite, within which the silica fusions are placed upon forms 13 which will be described in greater detail in connection with Fig. 2. These forms rest upon a graphite support 14 which in turn is supported upon plate 15. Plate 15 is connected to the heater terminals 16. These heater terminals, which may consist of copper, are supported from the tubes 17, through which a cooling fluid may also be supplied to the heater terminals. Surrounding the heater is a heat-conserving screen 18, which may consist of a graphite container filled with finely divided carbonaceous material. These and other details of furnace construction are described in the above mentioned Devers patent.

Within the heat zone enclosed by the furnace resistor are placed a number of stacked forms which, as shown in Fig. 2, consist of a plate 20 of graphite or any suitable refractory material on which are placed vertical strips 21 which are held in position by pegs 22. These strips preferably are notched as indicated at 23 to permit gases to escape. Within the enclosure formed by the strips 21 is placed a charge 24, consisting of fragments of silica, preferably in the form of crystalline quartz. Chips of Brazilian quartz crystals may be used. These fragments preferably should have the size of about 1/8 inch diameter, but the size relation is not critical. An unusually high grade of crystalline quartz is not required. Such quantity of silica is chosen for fusion as required to produce the sheet material of desired dimensions. A number of readily demountable enclosures, consisting of plates and strips as above described, may be employed in stacked relation. In some cases the surface of the graphite may be painted with glue to insure the silica when congealed readily separating from the graphite and to produce a uniform dabbling configuration to the surface.

Fig. 2 illustrates but two of such forms, each provided with a charge 24 of silica, but I wish it to be understood that the number of forms need be governed only by the size of the furnace and other practical considerations. When the charges of silica arranged in the stacked forms are ready for fusion within the furnace the gaseous interior of the furnace is evacuated until the furnace temperature is gradually increased to about 1750 to 1800° C., evacuation being continued during the heat process. At about 1750° C. the silica becomes plastic and spreads by gravity uniformly over the support 20. As described in the above Devers patent, a minimum of gas is enclosed by the fusion and coalescense of the particles of crystalline quartz, but there exists nevertheless in the quartz fusion a number of cavities which are filled with a very highly attenuated gas, or else contain no other gas than the vapor of silica itself. If the silica fusion were caused to congeal under these conditions the resulting plate material would be cloudy and therefore inefficient for the transmission of sun light for therapeutic or other purposes. A gas pressure is therefore applied upon the silica fusion either by shutting the valve 7 and permitting the gas pressure to rise within the furnace by the accumulation of the gases evolved from the graphite and other parts of the furnace, or better still, by the admission of gas under pressure through the pipe 8. The amount of pressure which need be employed in carrying out my invention will vary with the character of the raw material and the degree of transparency desired in the finished product. For some purposes the cheaper grade of product is desired and the raw material does not in any event permit of the production of the highest grade of transparent plate material. I prefer to simply shut off the vacuum system from the furnace and allow the pressure within the furnace to build up to approximately atmospheric pressure. In other cases, when a high grade product is desired, suitable gas, such as nitrogen, is admitted at a pressure of about 200 pounds per square inch. In some cases lower pressures may be used.

The plate material produced by carrying out my invention preferably should have a thickness of about 1/16 to 3/8 inch. A material of lesser thickness is apt to suffer in regularity of form by the evolution of gases from the supporting plate. A thicker material, of course, would be less efficient for the transmission of ultra-violet radiations of sunlight. The surface area of the plates is governed only by practical consideration but ordinarily may vary from say 25 to 250 square inches. The surface of the material produced in accordance with my invention has very much the appearance of clear ice which is formed under ordinary, natural conditions. There are some slight surface inequalities and flow marks, and in some cases small patches of clouded areas, but in general the material is clear and suitable for use without grinding and polishing. In some cases it may be desirable to remove surface excrescences by cutting them away with a grinding tool and in most cases it is desirable to shape the edges of the resulting plate material to greater regularity, but in general the plate material produced in accordance with my invention may be used directly in the construction of windows. The main difference between such a window material and the plate material heretofore produced by subdivision of ingots of silica followed by a polishing of the faces of such plate material is in the configuration of the faces of such plates the former having the slight undulations and the glazed characteristic of material congealed or set from fusion.

What I claim as new and desire to secure by Letters Patent of the United States, is,—

1. A transparent window pane of silica having a thickness of about 1/16 to 3/8 inch and a comparatively extensive surface area, the opposite faces of said pane having the configuration of silica congealed from fusion.

2. A substantially clear plate of silica having a thickness of the order of a small fraction of an inch and an area of the order of 25 to 250 square inches, said plate having the glazed surface areas characteristic of a material set from fusion.

In witness whereof, I have hereunto set my hand this eleventh day of February, 1929.

JAMES H. SULLIVAN.